(12) United States Patent
Boudreau et al.

(10) Patent No.: US 7,744,041 B2
(45) Date of Patent: Jun. 29, 2010

(54) VERTICAL PIPE GUARD

(76) Inventors: Martin Boudreau, 894 Alain Grandbois, Boisbriand, Quebec, J7G 3C9 (CA); Jean-Pierre Thibault, 1750 boul. des Seigneurs, Terrebonne, Quebec, J6X 2K1 (CA)

( * ) Notice: Subject to any disclaimer, the term of this patent is extended or adjusted under 35 U.S.C. 154(b) by 0 days.

(21) Appl. No.: 12/148,861

(22) Filed: Apr. 23, 2008

(65) Prior Publication Data

US 2008/0203241 A1 Aug. 28, 2008

Related U.S. Application Data

(63) Continuation-in-part of application No. 11/282,373, filed on Nov. 18, 2005, now abandoned.

(51) Int. Cl.
*E21F 17/02* (2006.01)
(52) U.S. Cl. .............. 248/58; 248/72; 248/57; 174/40 R
(58) Field of Classification Search .............. 248/228.1, 248/228.7, 230.7, 57, 58, 61, 216.4, 59, 60, 248/56, 72; 174/40 R
See application file for complete search history.

(56) References Cited

U.S. PATENT DOCUMENTS

| 1,821,295 | A | * | 9/1931 | Dieter | 248/56 |
|---|---|---|---|---|---|
| 2,699,462 | A | * | 1/1955 | Exner | 174/140 R |
| 3,185,763 | A | * | 5/1965 | Harmon | 174/144 |
| D306,553 | S | * | 3/1990 | Rumpel | D8/395 |
| 5,642,557 | A | * | 7/1997 | Clews | 24/339 |
| 5,791,607 | A | * | 8/1998 | Thibault et al. | 248/58 |
| 5,906,341 | A | * | 5/1999 | Brown | 248/49 |
| 6,182,930 | B1 | * | 2/2001 | Lindborg | 248/49 |
| 6,241,199 | B1 | * | 6/2001 | Ismert | 248/56 |
| 6,448,493 | B1 | * | 9/2002 | Efraimsson et al. | 174/40 R |
| 7,055,783 | B2 | * | 6/2006 | Rosemann et al. | 248/71 |
| 2005/0116129 | A1 | * | 6/2005 | Boudreau et al. | 248/228.7 |
| 2005/0121559 | A1 | * | 6/2005 | King | 248/68.1 |

* cited by examiner

*Primary Examiner*—J. Allen Shriver, II
*Assistant Examiner*—Bradley H Duckworth
(74) *Attorney, Agent, or Firm*—Eric Fincham

(57) ABSTRACT

A pipe support assembly which comprises a main body having a U-shaped recess therein, and a cover member for the body, the cover member having an arcuate configuration and being sized to fit between the first and second side walls, each of the cover members and body having a channel or a recess designed to receive a tie wrap to secure a pipe in position. The main body portion also has a clamping portion which comprises first and second resilient members.

7 Claims, 6 Drawing Sheets

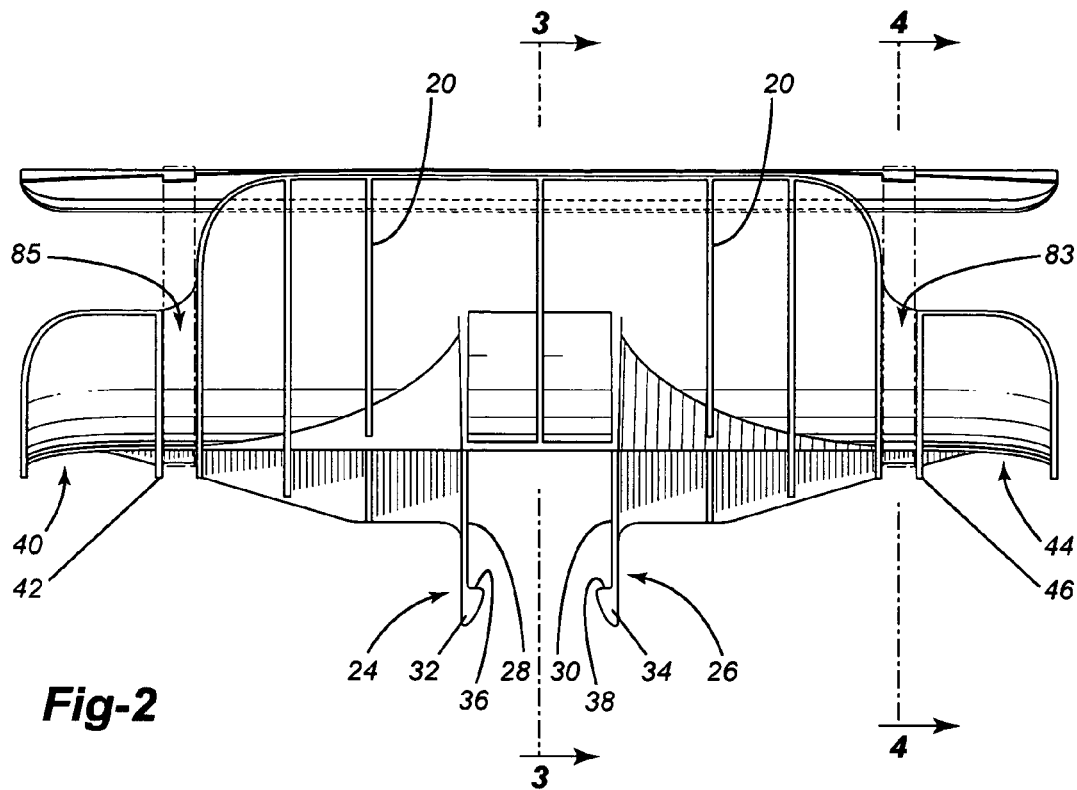
Fig-2
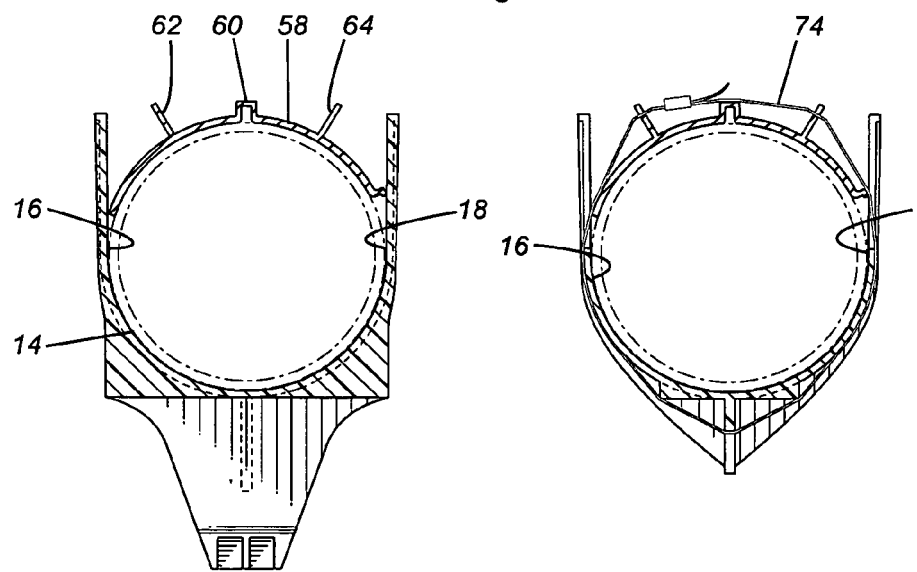
Fig-3 Fig-4

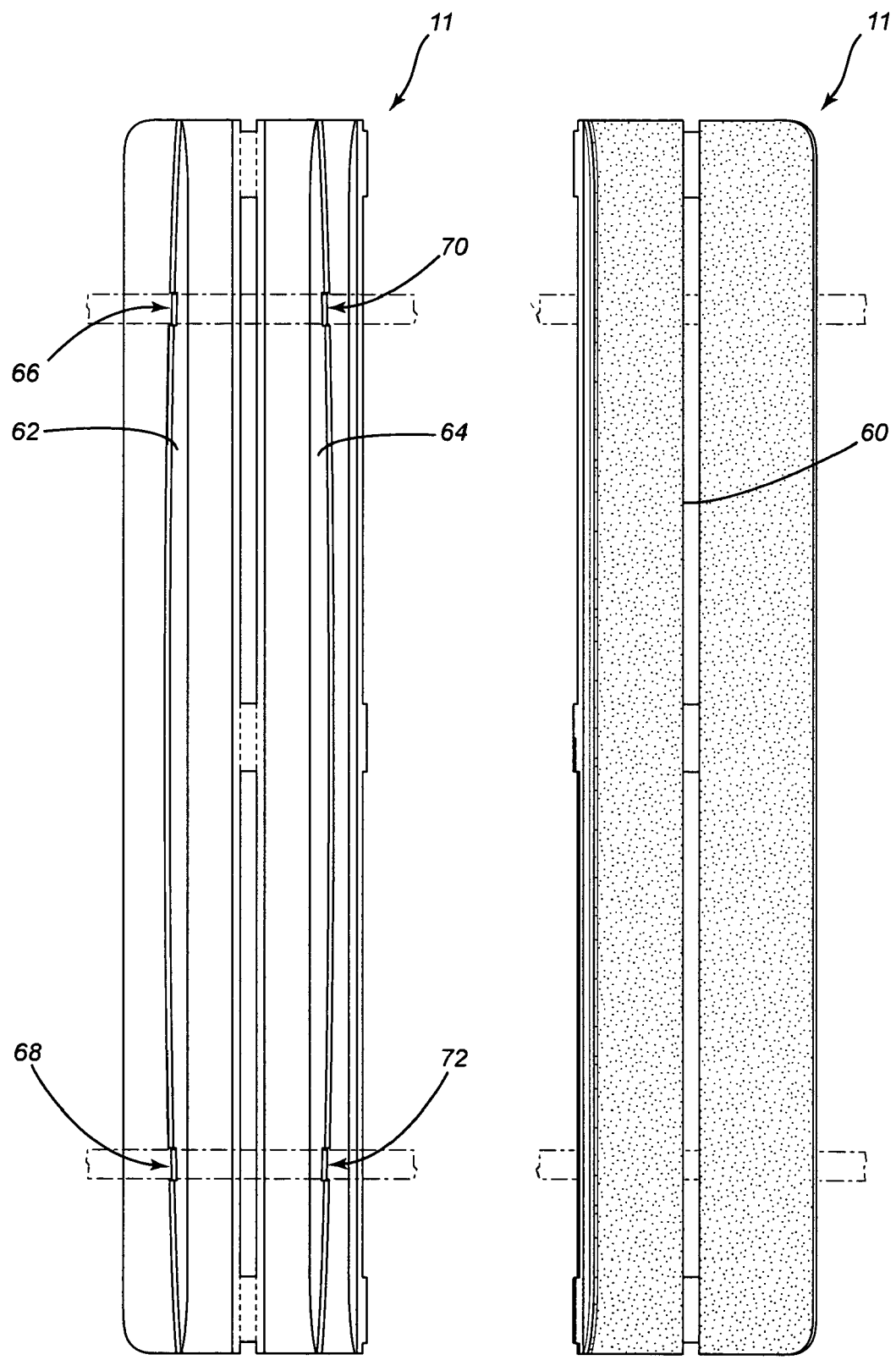
*Fig-5*  *Fig-6*

VERTICAL PIPE GUARD

The present application is a continuation in part of application Ser. No. 11/282,373 filed Nov. 18, 2005 now abandoned.

FIELD OF THE INVENTION

The present invention relates to a pipe support system and more particularly, relates to a pipe support system for vertically extending pipes.

BACKGROUND OF THE INVENTION

In the installation of pipes and the like in various types of buildings and in particular pipes associated with air conditioning, refrigeration and heating, such as may be utilized in many commercial and industrial establishments, conventional practice is that the pipes are hung from the ceiling by strap hangers.

The most common type of strap hanger employed in the industry comprises a metal strap having apertures for fastening purposes. The strap is looped about the pipe to be secured and then a fastening such as a screw or a similar member is secured to a substrate such as a beam or rafter through the apertures. A similar arrangement is employed when the pipes follow a vertical outline as is also frequently required in their transporting of a fluid from one location to another.

This conventional means of fastening pipes suffers from several disadvantages. Initially, each pipe must be installed individually and as such the installation process is relatively labour intensive. Secondly, the hangers can cause rupturing of the pipes after a period of time. This would occur due to movement of the pipe within the pipe hanger and subsequent surface damage. This movement can occur either due to mechanical vibrations, and/or to a thermal expansion and contraction.

SUMMARY OF THE INVENTION

It is an object of the present invention to provide a pipe support system which may be used in vertical runs of pipes.

According to one aspect of the present invention, there is provided a pipe support comprising a body having a recess formed therein, the recess having a generally U-shaped configuration and being open at a top end thereof, the recess being defined by a bottom wall and first and second side walls, a plurality of ribs on an exterior surface of the bottom wall, at least four of the ribs extend transversely thereof to define first and second spaced apart body channels, a clamping portion extending downwardly from the body, the clamping portion comprising first and second resilient members, each of the first and second resilient members comprising a vertical side wall and an inwardly extending end segment, the vertical side walls extending transversely with respect to the side walls defining the recess, a cover member for the body, the cover member having an arcuate configuration and being sized to fit between said first and second side walls, the cover member having first and second cover channels formed on an exteriorly facing surface, the channels extending transversely thereof, each of the first and second cover channels being aligned with the body channels formed on the bottom wall when the cover is placed above the body and between the side walls, the body channels and the cover channels being designed to receive a securing member.

According to a further aspect of the present invention, there is provided a pipe support comprising a body having a recess formed therein, the recess having a generally U-shaped configuration and being open at a top end thereof, the recess being defined by a bottom wall and first and second side walls, a plurality of ribs on an exterior surface of the bottom wall, at least four of the ribs extend transversely thereof to define first and second spaced apart body channels, a clamping portion extending downwardly from the body, the clamping portion comprising first and second resilient members, each of the first and second resilient members comprising a vertical side wall and an inwardly extending end segment, the clamping portion being releasably secured to the body whereby the clamping portion can have its orientation changed.

According to a still further aspect of the present invention there is provided in a building having a plurality of pipes and truss members and wherein the pipes include a vertical portion, the improvement comprising a pipe support secured to a horizontally extending truss member, the pipe support comprising a body having a recess formed therein, the recess having a generally U-shaped configuration and being open at a top end thereof, the recess being defined by a bottom wall and first and second side walls, a plurality of ribs on an exterior surface of the bottom wall, at least four of the ribs extend transversely thereof to define first and second spaced apart body channels, a clamping portion extending outwardly from the body, and being clamped to the truss member, the clamping portion comprising first and second resilient members, each of the first and second resilient members comprising a resilient member side wall and an inwardly extending end segment, each of the resilient member side walls extending transversely with respect to the side walls defining said recess, a cover member for the body, the cover member having an arcuate configuration and being sized to fit between the first and second side walls, the cover member having first and second cover channels formed on an exteriorly facing surface, the cover channels extending transversely thereof, each of the first and second cover channels being aligned with the body channels formed on the exterior surface of the bottom wall, and a pair of securing members passing in the body and cover channels to secure the body and the cover together.

The pipe support assembly of the present invention is designed to be used for vertically extending pipes and to this end, there is provided a cover member which is secured to the bottom member by means of a tie wrap.

BRIEF DESCRIPTION OF THE DRAWINGS

Having thus generally described the invention, reference will be made to the accompanying drawings illustrating an embodiment thereof, in which:

FIG. 2 is a side elevational thereof;

FIG. 3 is a cross sectional view taken along the lines 3-3 of FIG. 2;

FIG. 4 is a cross sectional view taken along the lines 4-4 of FIG. 2;

FIG. 5 is a top plan view of the upper cover member;

FIG. 6 is a bottom plan view of the upper cover member;

DETAILED DESCRIPTION OF THE INVENTION

Figure 1:
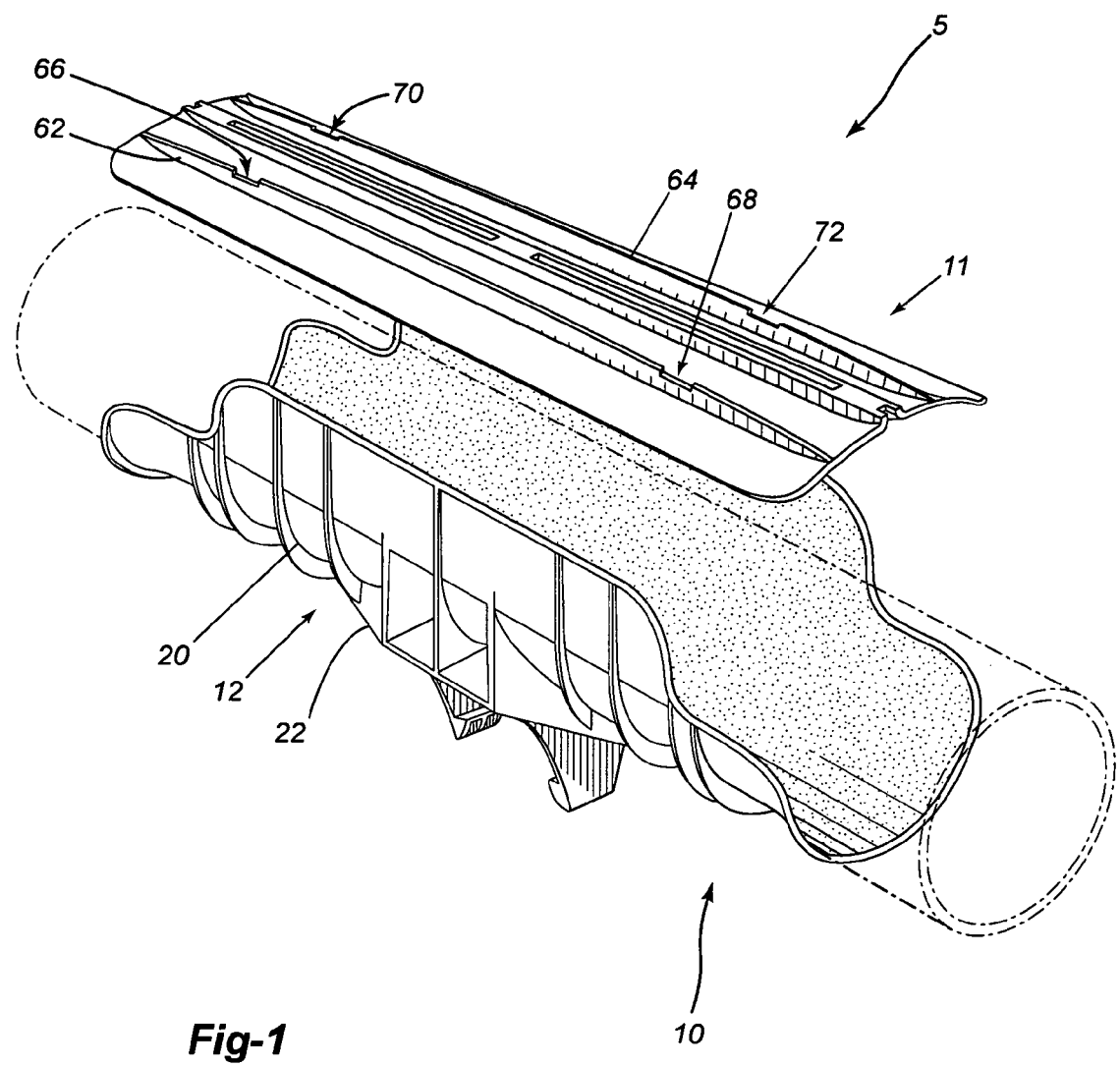
FIG. 1 is a perspective view of a pipe support assembly according to one embodiment of the present invention with a pipe being shown in phantom.

Referring to the drawings in greater detail, and by reference characters thereto, there is illustrated a pipe support assembly which is generally designated by reference numeral 5.

Pipe support assembly 5 is similar to that shown in application Ser. No. 10/966,568 carrying a filing date of Oct. 15, 2004, the disclosure of which is hereby incorporated by reference.

Pipe support assembly 5 includes a lower support member 10 and an upper support member 11. Lower support member 10 includes a central body portion generally designated by reference numeral 12 and which body portion 12 comprises a bottom wall 14 which of an arcuate configuration and upwardly extending side walls 16 and 18.

On the exterior facing surface of bottom wall 14 and side walls 16, 18 there are provided spaced transverse flanges 20. As will be noted, there are also provided longitudinally extending flanges 22, with three such flanges being illustrated.

Lower support 10 is designed to be attached to a truss type support and to this end, there are provided a pair of fastening or clamping members generally designated by reference numerals 24 and 26. Fastening members 24, 26 each have a respective side wall 28, 30 which extends outwardly from bottom wall 14. Each side wall 28, 30 in turn has respective inwardly extending end segments 32, 34. End segments 32, 34 have a respective end wall 36, 38 such that there is defined therebetween a recess designed to fit around a truss member. Naturally, it will be understood that side walls 28, 30 are somewhat flexible or resilient in order that they can be placed about the truss member.

At one end of pipe support of member 10, there is provided an extended tongue portion generally designated by reference numeral 40. It will be noted that there is provided a rib 42 extending thereabout for reasons which will be discussed hereinbelow. Similarly, at the other end of central body portion 12, there is provided a second extended tongue 44 having rib 46 associated therewith. Each one of tongues 40, 44 is characterized by a side wall which is of a lesser height than a central portion of the side walls.

Upper support member 11 has an arcuate body 58 which includes a centre channel 60 extending in a longitudinal direction. On the outer facing surface of upper support member 11, there are provided a pair of longitudinally extending flanges 62 and 64. As may be seen in FIG. 1, there are provided a pair of notches or recesses 66, 68 in flange 62. Similarly, a pair of notches 70, 72 are provided in flange 64.

As previously mentioned, there is provided a rib 42 in extended tongue portion 40 and which, with a rib in the main body portion, defines a channel 85 at the point of juncture of the extended tongue portion 40 with main body portion 12. Similarly, at the other end, there is provided a channel 83 partially defined by rib 46.

The arrangement is such that once a pipe is placed in lower support member 10, cover portion 11 may then be placed thereabout and a tie wrap 74 used to secure cover 11 to body portion 12. Tie wrap 74 may be then be secured in position and tightened as it passes within a respective channel 83, 85 and notches 66, 68, 70 and 72.

Figure 7:
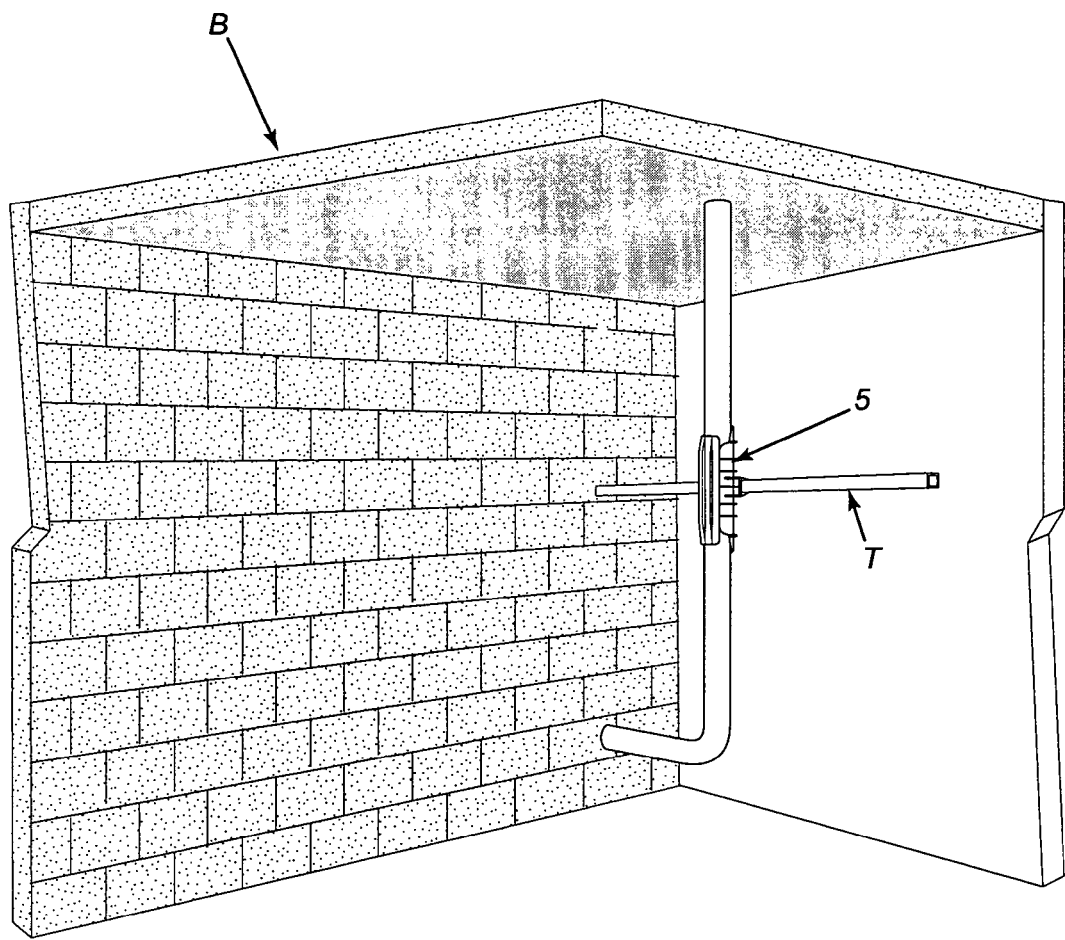
FIG. 7 is perspective view of the pipe support in a building.
Figure 8:
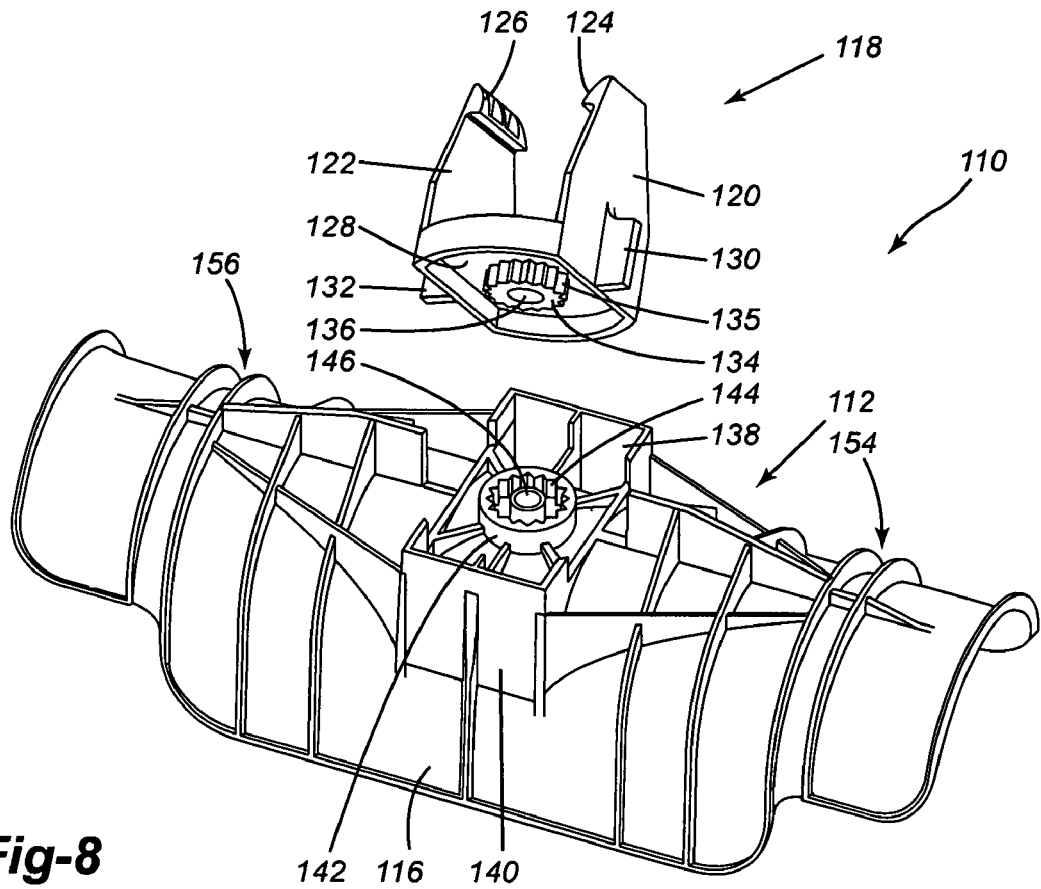
FIG. 8 is an exploded view of a further embodiment of the pipe support assembly according to the present invention.

As shown in FIG. 7, pipe support 5 may be mounted in a vertical orientation on truss T within a building B.

Turning to the embodiment of FIGS. 8 to 12, there is illustrated therein a pipe support assembly 110 which includes a main body portion 112 similar in structure to that shown in the previously described embodiment. Thus, body 112 includes a U-shaped section 116. However, there is provided a separate clamping structure generally designated by reference numeral 118 and which clamping structure 118 includes a pair of side walls 120, 122 with respective end segments 124, 126 for clipping on a truss in the manner previously described. A central base portion 128 includes a pair of flanges 130, 132 extending from opposite sides thereof for reasons which will become apparent hereinbelow. Located centrally thereof is a base structure 134 which has a plurality of teeth 135. An aperture 136 extends through portion 134.

Figure 10:
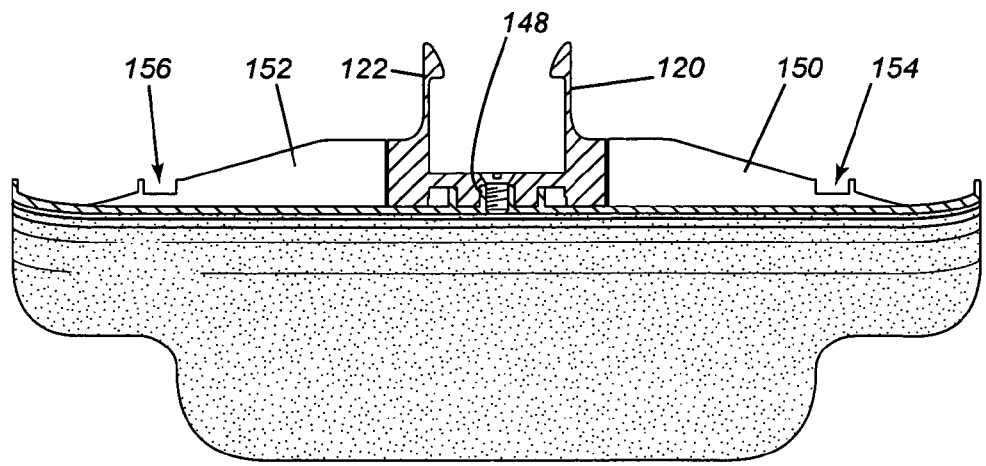
FIG. 10 is a cross sectional view thereof.

Body member 112 includes a pair of side walls 138, 140 on the bottom thereof. Intermediate thereof, there is a central portion 142 and which also has a plurality of teeth 144 formed thereon. Portion 142 is designed to receive portion 134 and is locked in position and prevented from rotating. Clip member 118 is secured to main body portion 112 by means of a screw 148 (FIG. 10).

Figure 9:
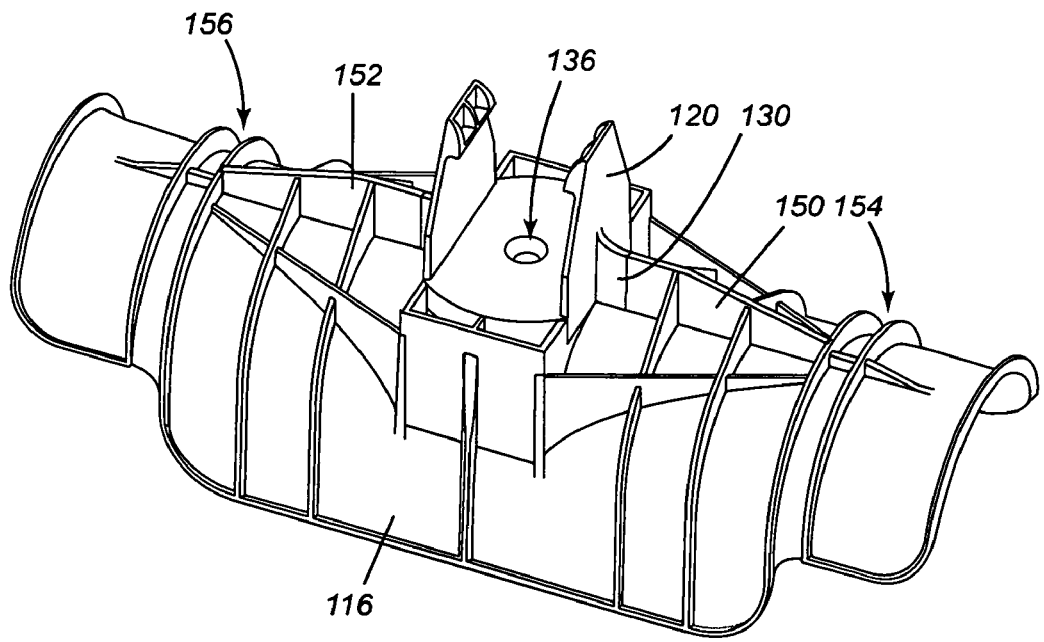
FIG. 9 is a perspective view of the bottom of the pipe support assembly.

As may be seen in FIG. 9, when placed in a "normal" position, flanges 130, 132 align with central ribs 150 and 152.

As in the previously described embodiments, there are provided channels 154, 156 proximate the end of body 116. It will be noted that ribs 150, 152 are of a sufficient height such that any securing member such as a tie wrap placed about the body is automatically directed to channels 154, 156.

Figure 11:
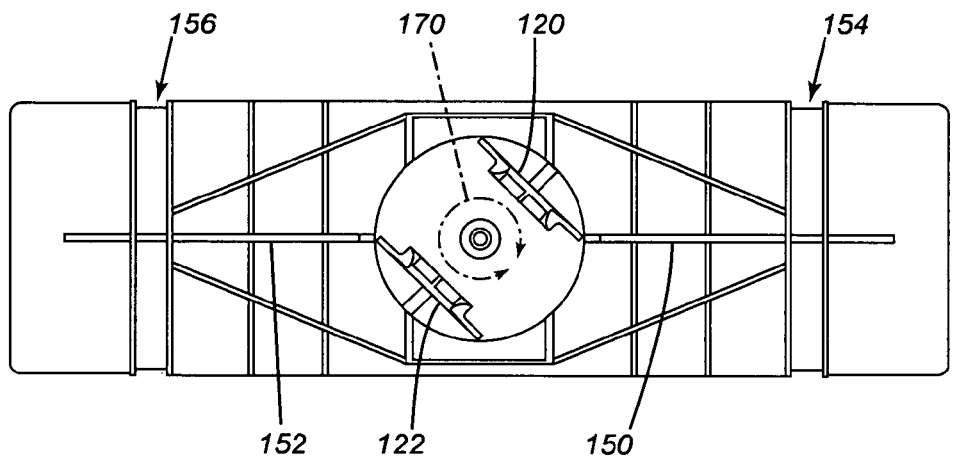
FIG. 11 is a bottom plan view illustrating movement of the clamping portion of the assembly.
Figure 12:
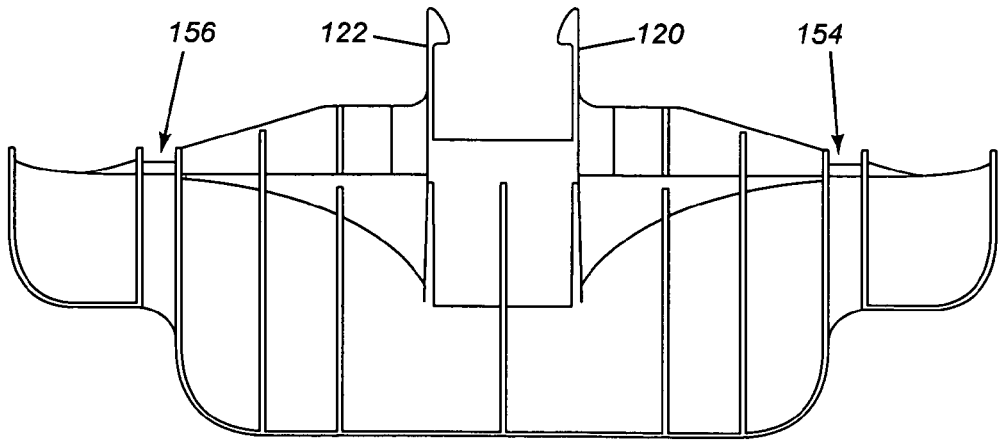
FIG. 12 is a side elevational view thereof.

As may be seen in FIG. 11, the structure permits clamping member 118 to be rotated to a different position (arrow 170) when the occasion requires.

As may be seen in FIGS. 1 and 6, the surfaces contacting the insulated pipe have textured surfaces.

It will be understood that the above described embodiment is for purposes of illustration only and that changes and modifications may be made thereto without departing from the spirit and scope of the invention.

We claim:

1. A pipe support comprising:
a body having a recess formed therein, said recess having a generally U-shaped configuration and being open at a top end thereof;
said recess being defined by a bottom wall and first and second side walls;
a plurality of ribs on an exterior surface of said bottom wall, at least four of said ribs extend transversely thereof to define first and second spaced apart body channels;
a clamping portion extending downwardly from said body, said clamping portion comprising first and second resilient members;
each of said first and second resilient members comprising a vertical side wall and an inwardly extending end segment, said vertical side walls extending transversely with respect to said side walls defining said recess;
a cover member for said body, said cover member having an arcuate configuration and being sized to fit between said first and second side walls;
said cover member having first and second cover channels formed on an exteriorly facing surface said channels extending transversely thereof, each of said first and second cover channels being aligned with said body channels formed on said bottom wall when said cover is placed above the body and between the side walls, said body channels and said cover channels being designed to receive a securing member.

2. The pipe support of claim 1 wherein said pipe support is formed of a plastic material.

3. The pipe support of claim 2 wherein said first and second side walls each have a central portion and a pair of end portions, said central portion extending upwardly from said bottom wall a greater distance than said end portions.

4. The pipe support of claim 3 wherein said body channels are located proximate a point where a respective end portion meets said central portion.

5. The pipe support of claim 1 further including first and second longitudinal ribs, each longitudinal rib being located on an exterior surface of said bottom wall, each longitudinal rib extending from said clamping portion to a respective body channel, the arrangement being such that a securing member placed about said body will be directed to one of said body channels.

6. A pipe support comprising:
- a body having a recess formed therein, said recess having a generally U-shaped configuration and being open at a top end thereof;
- said recess being defined by a bottom wall and first and second side walls;
- a plurality of ribs on an exterior surface of said bottom wall, at least four of said ribs extend transversely thereof to define first and second spaced apart body channels;
- a clamping portion extending downwardly from said body, said clamping portion comprising first and second resilient members;
- each of said first and second resilient members comprising a vertical side wall and an inwardly extending end segment, said clamping portion being releasably secured to said body whereby said clamping portion can have its orientation changed.

7. In a building having a plurality of pipes and truss members and wherein said pipes include a vertical portion, the improvement comprising a pipe support secured to a horizontally extending truss member, said pipe support comprising:
- a body having a recess formed therein, said recess having a generally U-shaped configuration and being open at a top end thereof;
- said recess being defined by a bottom wall and first and second side walls;
- a plurality of ribs on an exterior surface of said bottom wall, at least four of said ribs extend transversely thereof to define first and second spaced apart body channels;
- a clamping portion extending outwardly from said body, and being clamped to said truss member, said clamping portion comprising first and second resilient members;
- each of said first and second resilient members comprising a resilient member side wall and an inwardly extending end segment;
- each of said resilient member side walls extending transversely with respect to said side walls defining said recess;
- a cover member for said body, said cover member having an arcuate configuration and being sized to fit between said first and second side walls;
- said cover member having first and second cover channels formed on an exteriorly facing surface, said cover channels extending transversely thereof, each of said first and second cover channels being aligned with said body channels formed on said bottom wall; and
- a pair of securing members passing in said body and cover channels to secure said body and said cover together.

* * * * *